United States Patent
Urbach et al.

(10) Patent No.: US 6,250,840 B1
(45) Date of Patent: Jun. 26, 2001

(54) TIE ROD END

(75) Inventors: Brian A. Urbach, Rochester Hills; Gregory R. Smith, Sterling Heights, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/151,838

(22) Filed: Sep. 11, 1998

(51) Int. Cl.$^7$ .................................................. F16C 11/06
(52) U.S. Cl. .............................................. 403/135; 403/133
(58) Field of Search ................................ 403/122, 132, 403/133, 134, 135, 140

(56) References Cited

U.S. PATENT DOCUMENTS

| | | |
|---|---|---|
| 3,367,728 | 2/1968 | Labbie . |
| 3,833,309 * | 9/1974 | Hobbs ................................. 403/122 |
| 4,690,581 * | 9/1987 | Umemoto et al. ................... 403/133 |
| 4,758,110 | 7/1988 | Ito . |
| 4,904,107 | 2/1990 | Fukukawa et al. . |
| 5,011,321 | 4/1991 | Kidokoro . |
| 5,044,811 * | 9/1991 | Suzuki et al. ....................... 403/133 |
| 5,489,161 * | 2/1996 | Sugita et al. ....................... 403/134 |
| 5,611,635 | 3/1997 | Schutt et al. . |
| 5,630,672 * | 5/1997 | McHale ............................... 403/135 |
| 5,697,723 * | 12/1997 | Wood .................................. 403/132 |
| 5,855,448 * | 1/1999 | Showalter et al. .................. 403/134 |
| 5,885,022 * | 3/1999 | Maughan et al. .................... 403/122 |

FOREIGN PATENT DOCUMENTS

2431418 * 6/1974 (DE) ..................................... 403/132

* cited by examiner

Primary Examiner—Lynne H. Browne
Assistant Examiner—John R. Cottingham
(74) Attorney, Agent, or Firm—Tarolli, Sundheim, Covell, Tummino & Szabo L.L.P.

(57) ABSTRACT

A tie rod end (16) comprises a metal stem (30) having a first surface (44) defining a first chamber (48). A ball stud (130) has a ball end (132) and a stud shaft (134). A plastic bearing (70) is located in the first chamber (48). The plastic bearing (70) includes a tubular sleeve portion (72) press fit in the first chamber (48). The tubular sleeve portion (72) has an open first end (76) and an opposing second end (78). The stud shaft (34) extends through the open first end (76). The tubular sleeve portion (72) includes a second surface (96) partially defining a second chamber (90). The second surface (96) engages the ball end (132) for relative sliding movement. The plastic bearing (70) further includes a plastic plug member (110) disposed in the second chamber (90). The plastic plug member (110) is fixedly attached to the tubular sleeve portion (72) and closes the second end (78) of the tubular sleeve portion. The plastic plug member (110) engages the ball end (132) for relative sliding movement.

6 Claims, 2 Drawing Sheets

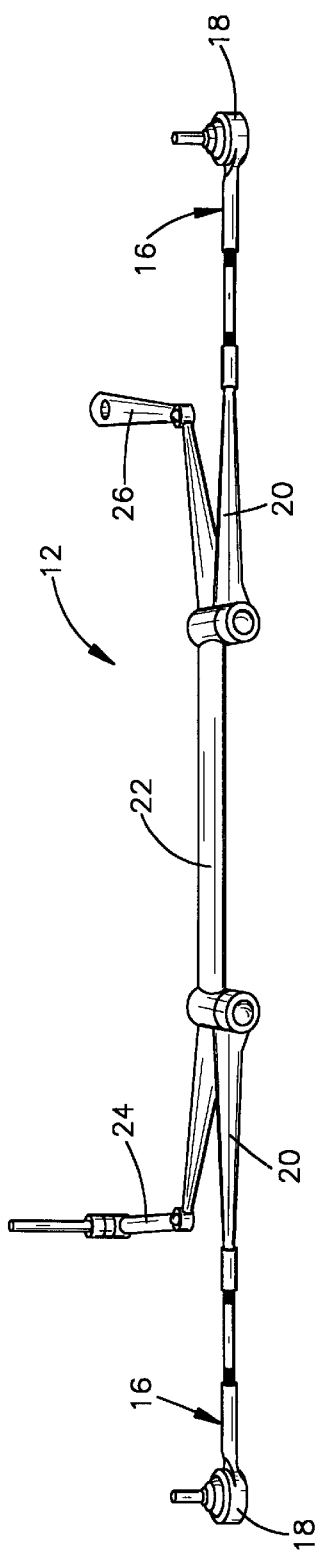
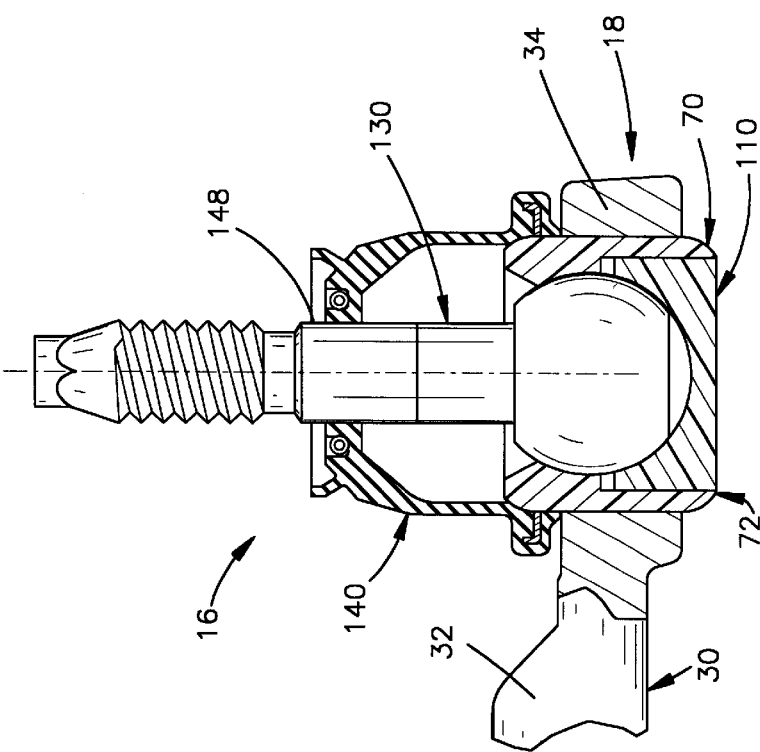
Fig.1
Fig.2

TIE ROD END

TECHNICAL FIELD

The present invention is directed to a tie rod end and, more particularly, is directed to an outer tie rod end for use in a vehicle steering linkage.

BACKGROUND OF THE INVENTION

A vehicle steering linkage is typically used to turn the steerable wheels of a vehicle. The steering linkage connects the output of an actuatable steering gear to the steerable wheels. The steering gear is actuated by the driver of the vehicle turning the vehicle steering wheel.

A known steering linkage includes a pair of tie rods connected by a center link. Each tie rod has an inner end connected to the center link and an outer end. The outer end of each tie rod connects to a spindle associated with a front wheel of the vehicle. The outer tie rod ends typically comprise ball and socket joints which allow for relative rotational movement between a respective tie rod and associated wheel spindle.

SUMMARY OF THE INVENTION

The present invention is a tie rod end comprising a metal stem having a first surface defining a first chamber. The first chamber is centered on an axis and has opposite open ends. A ball stud is centered on the axis. The ball stud has a ball end and a stud shaft. A plastic bearing is located in the first chamber and projects through the opposite open ends of the first chamber. The plastic bearing includes a tubular sleeve portion press fit in the first chamber. The tubular sleeve portion has an open first end and a second end disposed opposite the first end. The stud shaft extends through the open first end of the tubular sleeve portion. The tubular sleeve portion includes a second surface partially defining a second chamber in the tubular sleeve section and centered on the axis. The second surface engages the ball end of the ball stud for relative sliding movement. The plastic bearing further includes a plastic plug member disposed in the second chamber. The plastic plug member is fixedly attached to the tubular sleeve portion and closes the second end of the tubular sleeve portion. The plastic plug member engages the ball end of the ball stud for relative sliding movement.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic perspective view of a vehicle steering linkage having a pair of tie rod ends constructed in accordance with the present invention;

FIG. 2 is a sectional view of a portion of FIG. 1; and

DESCRIPTION OF A PREFERRED EMBODIMENT

Figure 3:
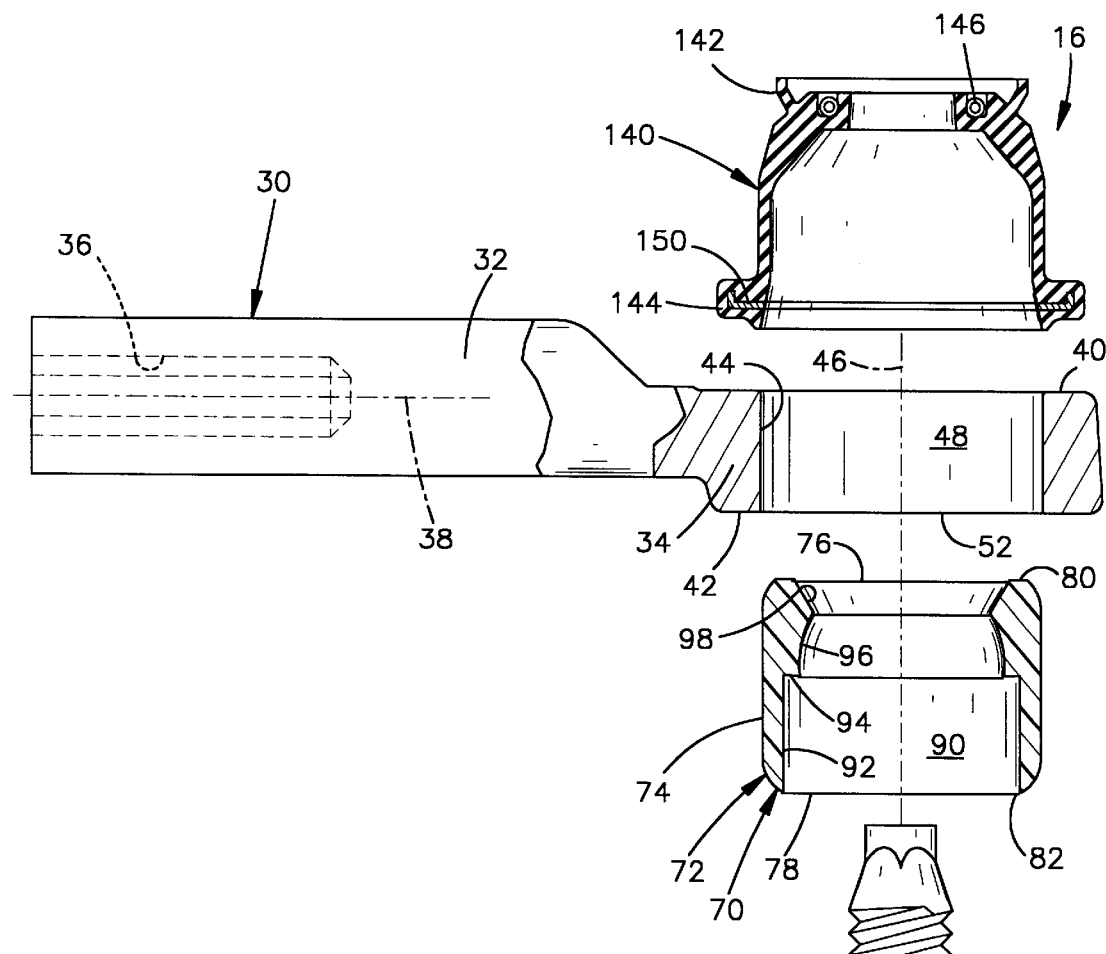
FIG. 3 is an exploded sectional view of FIG. 2.

The present invention is a tie rod end. A tie rod end embodying the present invention may be used in a variety of applications. The present invention is shown in FIG. 1 as embodied in a portion of a vehicle steering linkage 12 used to turn the steerable wheels (not shown) of a vehicle. The steering linkage 12 includes a pair of tie rod ends 16 constructed in accordance with the present invention.

Each tie rod end 16 includes a ball and socket assembly 18 which is adapted to be connected to a front wheel spindle (not shown) of the vehicle. Each tie rod end 16 is connected to a tie rod 20 which is pivotally connected to an intermediate portion of a center link 22. The center link 22 is connected at one end to an idler arm 24 which is pivotally mounted on the vehicle frame (not shown). The opposite end of the center link 22 is connected to a pitman arm 26 which is connected to the output shaft of a vehicle steering gear (not shown). Actuation of the steering gear causes turning movement of the steerable wheels through the steering linkage 12 in a known manner.

The tie rod ends 16 are identically constructed and therefore only one will be described in detail. The tie rod end 16 includes a metal stem 30 (FIG. 3) having a first section 32 and a second section 34. The metal stem 30 may be made of aluminum or forged from steel. The first section 32 of the metal stem 30 is generally cylindrical in shape and includes an inner surface 36 centered on a transverse axis 38. The inner surface 36 is internally threaded to receive an externally threaded portion of a tie rod (not shown).

The second section 34 of the metal stem 30 has parallel upper (as viewed in the Figures) and lower surfaces 40 and 42, respectively. A cylindrical inner surface 44 extends along an axis 46 between the first and second surfaces 40, 42. The axis 46 lies perpendicular to the transverse axis 38. The cylindrical inner surface 44 defines a first chamber 48 in the second section 34 of the metal stem 30. The first chamber 48 is centered on the axis 46 and has open upper (as viewed in the Figures) and lower ends 50 and 52, respectively.

A plastic bearing 70 is disposed in the first chamber 48 in the second section 34 of the metal stem 30. The plastic bearing 70 is centered on the axis 46 and projects through the open upper and lower ends 50 and 52 of the first chamber 48. The plastic bearing 70 includes a tubular sleeve portion 72 having a cylindrical outer surface 74. The tubular sleeve portion 72 is press fit into the first chamber 48 such that the cylindrical outer surface 74 abuts the cylindrical inner surface 44 defining the first chamber 48.

The tubular sleeve portion 72 of the plastic bearing 70 has an open first end 76 and a second end 78 opposite the first end. The first end 76 is located axially above, as shown in FIG. 2, the upper surface 40 in the second section 34 of the metal stem 30 and includes a first end surface 80 (FIG. 3). The second end 78 of the tubular sleeve portion 72 is located below, as shown in FIG. 2, the lower surface 42 in the second section 34 of the metal stem 30 and includes a second end surface 82 (FIG. 3).

The tubular sleeve portion 72 of the plastic bearing 70 includes a second chamber 90 extending from the first end 76 of the tubular sleeve portion to the second end 78 of the tubular sleeve portion. The second chamber 90 is centered on the axis 46 and is defined by an axially extending surface 92, a radially extending surface 94, an annular arcuate surface 96, and a tapered surface 98. The tapered surface 98 intersects the first end surface 80 of the tubular sleeve portion 72 and the axially extending surface 92 intersects the second end surface 82 of the tubular sleeve portion. Inside the second chamber 90, the arcuate surface 96 extends from the tapered surface 98 to the radially extending surface 94 which intersects the axially extending surface 92.

The plastic bearing 70 further includes a plastic plug member 110 centered on the axis 46. The plug member 110 is disposed in the second chamber 90 in the tubular sleeve portion 72 of the plastic bearing 70 and closes the second end 78 of the tubular sleeve portion. The plug member 110 includes an axially extending cylindrical outer surface 112 and a hemispherical inner surface 114. A radially extending first end surface 116 connects the hemispherical surface 114 of the plug member 110 with the cylindrical outer surface 112. A radially extending second end surface 118 of the plug member 110 is co-planar with the second end surface 82 of the tubular sleeve portion 72 (FIG. 2).

The radially extending first surface 116 of the plug member 110 is axially spaced from the radially extending surface 94 of the tubular sleeve portion 72. The cylindrical outer surface 112 of the plug member 110 engages and is fixedly attached to the axially extending surface 92 of the tubular sleeve portion 72. In accordance with the preferred embodiment of the present invention, the cylindrical outer surface 112 of the plug member 110 and the axially extending surface 92 of the tubular sleeve portion 72 are ultrasonically welded to each other to form the plastic bearing 70.

The tie rod end 16 includes a ball stud 130 centered on the axis. The ball stud 130 is made of metal and includes a ball end 132 and a stud shaft 134. The ball end 132 has a generally spherical outer surface 136. The stud shaft 134 is generally cylindrical in shape and includes an externally threaded surface portion 138 known in the art.

The stud shaft 134 of the ball stud 130 extends through the open first end 76 of the tubular sleeve portion 72 of the plastic bearing 70. The ball end 132 of the ball stud 130 is disposed in the second chamber 90 in the tubular sleeve portion 72 of the plastic bearing 70. The spherical outer surface 136 of the ball end 132 engages the arcuate surface 96 in the tubular sleeve portion 72 of the plastic bearing 70 and is adapted for relative sliding movement thereon. The spherical outer surface 136 of the ball end 132 also engages the hemispherical inner surface 114 of the plug member 110 of the plastic bearing 70 and is adapted for relative sliding movement thereon. As is known in the art, grease or another suitable lubricant may be placed on the engaged surfaces 96/114 and 136 of the plastic bearing 70 and the ball end 132, respectively, to reduce the coefficient of friction during relative sliding movement.

A flexible sealing boot 140 seals the open first end 76 of the tubular sleeve portion 72 of the plastic bearing 70 to help prevent the ingress of dirt, water, or another contaminant into the tie rod end 16. The sealing boot 140 also helps to prevent grease from escaping from the tie rod end 16. The sealing boot 140 has a first end 142 encircling the stud shaft 134 of the ball stud 130 and a second end 144 encircling the open first end 76 of the tubular sleeve portion 72 of the plastic bearing 70. The first end 142 of the sealing boot 140 includes a first spring 146 which biases the first end of the sealing boot radially inward against an outer surface 148 of the stud shaft. The second end 144 of the sealing boot 140 includes a second spring 150 which biases the second end of the sealing boot radially inward against the cylindrical outer surface 74 of the tubular sleeve portion 72 of the plastic bearing 70.

To assemble the outer tie rod end 16, the tubular sleeve portion 72 of the plastic bearing 70 is press fit into the first chamber 48 in the metal stem 30. Next, the stud shaft 134 is inserted into the second end 78 of the tubular sleeve portion 72 of the plastic bearing 70 and moved axially upward (as viewed in the Figures) until the stud shaft projects through the open first end 76 of the tubular sleeve portion and the outer surface 136 of the ball end 132 engages the arcuate surface 96 in the second chamber 90 in the tubular sleeve portion.

The plug member 110 is then pressed into the second chamber 90 in the tubular sleeve portion 72. The hemispherical inner surface 114 of the plug member 110 seats against the outer surface 136 of the ball end 132 and the cylindrical outer surface 112 of the plug member engages the cylindrical inner surface 92 of the tubular sleeve portion 72. The plastic plug member 110 and the plastic tubular sleeve portion 72 are then ultrasonically welded together at their abutting surfaces 112 and 92, respectively. The sealing boot 140 is then moved into place over the open first end 76 of the tubular sleeve portion 72. The outer tie rod end 16 is now ready for connection to the center link 20 and a wheel spindle (not shown).

It should be understood that the outer tie rod end 16 could alternatively be assembled by initially placing the ball stud 130 into the tubular sleeve portion 72, ultrasonically welding the plug member 110 to the tubular sleeve portion, and then press fitting the assembly of the plastic bearing 70 and the ball stud 130 into the metal stem 30.

The two-piece (or composite) plastic bearing 70 described above provides a light weight and low cost construction for an outer tie rod end 16 or other ball and socket joint application. The plastic bearing 70 exhibits low torque characteristics desirable in most ball and socket joint applications.

From the above description of the invention, those skilled in the art will perceive improvements, changes and modifications. Such improvements, changes and modifications within the skill of the art are intended to be covered by the appended claims.

Having described the invention, we claim:

1. A tie rod end comprising:
    a metal stem having a first section and a second section, said first section being cylindrical in shape and defining an inner surface centered on a first axis, said inner surface being internally threaded to receive an externally threaded portion of a tie rod, said second section defining a first chamber, said first chamber being cylindrical and centered on a second axis which is transverse to the first axis, said first chamber having opposite open ends of equal diameter;
    a ball stud centered on the second axis, said ball stud having a ball end and a stud shaft;
    a plastic bearing in said first chamber and projecting through said opposite open ends of said first chamber, said plastic bearing including a tubular sleeve portion having a cylindrical outer surface, said cylindrical outer surface of said tubular sleeve portion being the radially outermost portion of said plastic bearing, said plastic bearing being press fit in said first chamber so that said cylindrical outer surface of said tubular sleeve portion is engaged by and encircled by said second section of said stem, said tubular sleeve portion having an open first end and a second end disposed opposite said first end, said stud shaft extending through said open first end of said tubular sleeve portion;
    said tubular sleeve portion including a second surface partially defining a second chamber in said tubular sleeve portion and centered on the second axis, said second surface engaging said ball end of said ball stud for relative sliding movement; and
    said plastic bearing further including a plastic plug member disposed in said second chamber, said plastic plug member being fixedly attached to said tubular sleeve portion and closing said second end of said tubular sleeve portion, said plastic plug member engaging said ball end of said ball stud for relative sliding movement.

2. The tie rod end of claim 1 wherein said plastic plug member is ultrasonically welded to said tubular sleeve portion of said plastic bearing.

3. The tie rod end of claim 1 further comprising a sealing boot having a first end encircling said stud shaft and a second end encircling said open first end of said tubular sleeve portion of said plastic bearing.

4. The tie rod end of claim 3 wherein said first end of said sealing boot includes first spring means for biasing said sealing boot against an outer surface of said stud shaft, said second end of said sealing boot including second spring means for biasing said sealing boot against an outer surface of said tubular sleeve portion.

5. The tie rod end of claim 1 wherein said second chamber in said tubular sleeve portion is defined by an annular arcuate surface and an axially extending surface, said arcuate surface engaging said ball end of said ball stud and said axially extending surface being fixedly attached to said plastic plug member.

6. The tie rod end of claim 5 wherein said plastic plug member includes a hemispherical surface engaging said ball end of said ball stud and an axially extending surface engaging said axially extending surface of said tubular sleeve portion.

* * * * *